United States Patent [19]
Kubo et al.

[11] Patent Number: 4,591,609
[45] Date of Patent: May 27, 1986

[54] METHOD FOR PRODUCING WATER-DISPERSIBLE COMPOSITIONS

[75] Inventors: Akira Kubo, Sakura; Kan Nishizaki, Ichihara; Yasuomi Okado, Narashino, all of Japan

[73] Assignee: Shinto Paint Co., Ltd., Amagasaki, Japan

[21] Appl. No.: 740,057

[22] Filed: May 30, 1985

[30] Foreign Application Priority Data

May 31, 1984 [JP] Japan ................................. 59-112461

[51] Int. Cl.⁴ ............................................... C08J 3/06
[52] U.S. Cl. .................................... 523/336; 523/337; 524/800; 524/801
[58] Field of Search ................ 523/336, 337; 524/800, 524/801

[56] References Cited

U.S. PATENT DOCUMENTS 4,451,594  5/1984  Campbell ........................... 523/336

Primary Examiner—Paul R. Michl
Attorney, Agent, or Firm—Wenderoth, Lind & Ponack

[57] ABSTRACT

A method for producing water-dispersible compositions is characterized in that an organo-synthetic resin having a softening point of not less than 65° C. is uniformly heating-mixed with a surface active agent, the mixture obtained is then uniformly mixed with water with stirring while maintaining a temperature above the phase inversion temperature, and the resulting system comprising said resin, surface active agent and water is cooled below the phase inversion temperature to bring about phase inversion in the system, whereby said resin is dispersed in water in the form of fine particles (the phase inversion temperature shall be a temperature higher than 30° C. below the softening point of the organo-synthetic resin but lower than the said softening point.

3 Claims, No Drawings

METHOD FOR PRODUCING WATER-DISPERSIBLE COMPOSITIONS

The present invention relates to a method for producing water-dispersible compositions in which an organo-synthetic resin having a high softening point has been stably dispersed in water in the form of fine particle.

The conventionally well-known method to disperse an organo-synthetic resin having a high softening point in water in the form of fine particle includes the following:

(A) A method as disclosed in Japanese Patent Application Kokai (Laid-open) No. 8263/1982 in which an organo-synthetic resin and a pigment are dry-blended, subjected to heating, melting and kneading on an extruder, cooled, dry-pulverized on a spin mill, etc., dispersed in water containing a surface active agent, and then more finely pulverized by means of pebble ball mills, ultrasonic waves, etc.

(B) A method as disclosed in Japanese Patent Application Kokai (Laid-open) No. 52851/1973 in which a solvent for coagulating an organo-synthetic resin having a high softening point is mixed with a liquid paint containing said resin and a solvent miscible with said solvent to deposit paint particles from said paint, a proportion of said solvent to said paint being inversely proportional to the desired particle size of said paint particles to be deposited.

(C) A method as disclosed in Japanese Patent Application Kokai (Laid-open) No. 94902/1980 in which a crosslinkable monomer is suspension-polymerized in water in the presence of a suspending agent to obtain the fine particle of the polymer.

These method, however, have their own defects as described below.

The method (A) requires many manufacturing steps such as dry-blending→heating/melting/kneading→mechanical dry-pulverizing→dispersing in water→additional pulverizing in water if necessary. Consequently, the economic burden is large.

In the method (B), when the solvent for coagulation is, for example water, the finally obtained paint from water is only a paint which is low in the concentration of effective component. And also, recovery of the miscible solvent and equipment therefor become necessary to result in a large economic burden.

The method (C) premises radical polymerization, so that it is limited in the scope of application. Besides, when the system contains hydrophilic pigments, etc., a part of the pigments disperses into water from the oleophilic monomer, so that it is impossible to incorporate all the pigments into the resulting polymer, and also suspension polymerization cannot be carried out smoothly.

In view of the present situation as described above, the present inventors made an extensive study with the object of providing a method for obtaining water-dispersible compositions with ease and at low cost in which an organo-synthetic resin having a high softening point has stably been dispersed in water in the form of fine particles. As a result, the present inventors found that the object of the present invention can be attained by obtaining said water-dispersible compositions by making use of the so-called phase inversion, i.e. a phenomenon in which the continuous phase (dispersion medium) and the dispersed phase of an emulsion change places with each other, whereby the form of the emulsion changes from w/o type to o/w type (or vice versa). The present invention was thus completed.

An object of the present invention is to provide the following method: In a method for producing water-dispersible compositions in which an organo-synthetic resin has been dispersed in water in the form of fine particles, a method for producing water-dispersible compositions characterized in that an organo-synthetic resin having a softening point of not less than 65° C. is uniformly heating-mixed with a surface active agent, the mixture obtained is then uniformly mixed with water with stirring while maintaining a temperature above the phase inversion temperature, and the resulting system comprising said resin, surface active agent and water is cooled below the phase inversion temperature to bring about phase inversion in the system, whereby said resin is dispersed in water in the form of fine particles.

The present invention will be illustrated in detail hereinafter.

The method of the present invention is one to stably disperse said resin in water in the form of fine particles by uniformly heat-mixing said resin, a surface active agent and if necessary, pigments, solvents, auxiliaries, etc. at a temperature above the melting point of said resin, adding water dropwise with stirring while maintaining a temperature above the phase inversion temperature inherent to the surface active agent, to form a uniform mixture, and cooling the resulting w/o type emulsion comprising said resin, surface active agent and water to a temperature below the phase inversion temperature to convert the w/o type emulsion to the o/w type one.

In the present invention, it is necessary for the organosynthetic resin to be present in water in the form of fine particles and besides to form a stable dispersed phase. For this purpose, the organo-synthetic resin used in the present invention should be selected from among those having a high softening point so that the dispersed resin particles in water do not fuse together.

A preferred softening point is not less than 65° C. When the softening point is less than 65° C., the fine particles of said resin obtained in water fuse together on being allowed to stand and change in particle diameter with the lapse of time, so that stable water-dispersible compositions are not obtained.

The softening point in the present invention was measured by the ring and ball method. When a mixed resin comprising two kinds of resin having different softening points of 100° C. and 50° C. in a certain mixing ratio has a softening point of 75° C., the softening point of this mixed resin is determined to be 75° C.

Examples of said organo-synthetic resin used in the present invention include for example epoxy resins, polyester resins, acrylic resins, phenol resins, polyamide resins, petroleum resins and derivatives thereof. These resins may also be used in mixture with auxiliaries such as curing resins, pigments, flow-out additives, etc.

Also, in the present invention, in order to attain higher degrees of fineness and dispersion stability of the organo-synthetic resin in water, it is preferred for said resin to have a polar group, i.e. an acid or basic group which is neutralized.

Such polar group includes for example anionic polar groups such as a carboxylic, sulfuric and phosphoric acid groups, etc., and cationic ones such as an amino, ammonium and sulfonium groups, etc. The concentration of the polar group affects the particle diameter of said resin obtained by phase inversion. For example, the larger the concentration of the polar group, the smaller the particle diameter, and conversely, the lower the concentration, the larger the diameter.

In the present invention, the concentration is preferably not less than 0.1 milligram equivalent, more preferably 0.2 to 3.0 milligram equivalent per gram of the resinous solid matter. Hereupon, as to a mixed resin comprising two kinds of resin having different polar group concentrations of 1 milligram equivalent and 0 milligram equivalent in a weight ratio of 1 to 1, the polar group concentration of the mixed resin is determined to be 0.5 milligram equivalent.

In the present invention, the effect of said polar group is developed by neutralization with a neutralizing agent.

The neutralization is carried out so that not less than one-tenth, preferably not less than one-fifth of said polar group concentration is neutralized.

When the polar group is of an anionic nature, neutralizing agents such as organic amines (e.g. alkylamine, alkanolamine), inorganic alkalis (e.g. KOH, NaOH), ammonia and the like are useful. When the polar group is of a cationic nature, neutralizing agents such as organic acids (e.g. formic acid, acetic acid, lactic acid) and inorganic acids (e.g. phosphoric acid, boric acid, carbonic acid) are useful.

In order to stably disperse the organo-synthetic resin having a high softening point in water as in the present invention, it is preferred to add a solvent to reduce the viscosity of the resin so that dispersion energy generated from stirrers, ultrasonic waves, etc. works effectively.

As such solvent, those which are both hydrophilic and infinitely soluble in water are preferred. When the solvent is oleophilic, it is contained in the resin in large amounts to cause the resin particles to fuse together. Such solvent is not therefore preferred.

As such hydrophilic solvent, those having a boiling point of not more than 145° C. are preferred.

Solvents having a boiling point exceeding 145° C. and an infinite solubility in water, because of their high solubility (high affinity) in the resin, cause the resin particles to fuse together as described above. And also, when the resulting water-dispersible composition has been coated onto a material to be coated and baking-dried, the solvent remains in the resulting coating film to lower the water resistance of the film. Such solvent is not therefore preferred.

Examples of such hydrophilic solvent include for example lower alcohols (e.g. methanol, ethanol), glycol ethers (e.g. ethylene glycol monoethyl ether), ketones (e.g. acetone), furans (e.g. tetrahydrofuran) and the like.

The amount of the hydrophilic solvent used is preferably not more than 30 wt. % of the resinous solid matter. When said amount exceeds this range, the solvent is contained in the resin in large amounts, which is not preferred as described above.

In the present invention, as described above, water-dispersible compositions in which an organo-synthetic resin has stably been dispersed in water in the form of fine particles, are obtained by bringing about the phase inversion of an emulsion comprising said resin, a surface active agent and water. The phase inversion temperature depends upon the property of said resin to be dispersed and that (HLB) of said surface active agent, but it should be a temperature higher than 30° C. below the softening point of said resin but lower than the said softening point.

When the phase inversion temperature is lower than that, the viscosity of the resin becomes too high for mechanical energy (stirring by dispers, ultrasonic waves, etc.) added to the emulsion to be well developed. It is therefore difficult to obtain fine particles.

The surface active agent used in the present invention is for the purpose of bringing about the phase inversion of said emulsion to obtain a stable aqueous dispersion liquid of fine particles of said resin. Consequently, the phase inversion temperature should be selected so that it is a temperature higher than 30° C. below the softening point of said resin but not higher than the said softening point.

As such surface active agent, those having a HLB of not less than 10 are preferred. For example, there may be used nonionic surface active agents such as polyoxyethylene type ones (e.g. polyoxyethylene nonylphenyl ether, polyoxyethylene lauryl ether), polyhydric alcohol fatty acid ester type ones, polyhydric alcohol derivatives, etc. These nonionic surface active agents may be used in mixture with anionic, cationic or amphoteric ones. The amount of the surface active agent used is important to the stabilization of the emulsion. Too large amounts sometimes cause a reduction in the water resistance of the final coating film, so that the amount should be limited low, being preferably 0.1 to 10 wt. % of the resinous solid matter.

In the present invention, a stabilizer for keeping the fine particles of said resin stable in water in a dispersed form may be used together with the foregoing components. Examples of such stabilizer include for example sparingly soluble phosphates (e.g. calcium tertiary phosphate, magnesium pyrophosphate), natural water-soluble high polymers (e.g. casein, gelatin), highly polar synthetic resins (e.g. acrylic copolymers, maleic copolymers) and the like.

As described above, by practicing the method of the present invention, water-dispersible compositions of organo-synthetic resins having a high softening point can be obtained with ease and at low cost without passing through such complicated manufacturing steps or polymerization steps for resins as conventionally employed.

The present invention will be illustrated hereinafter with reference to the following examples.

EXAMPLE 1

1000 Parts by weight of Villon GV-230 [polyester resin produced by Toyobo Co., Ltd. : acid value, 59; softening point, 93° C.; and concentration of polar group (carboxyl group), 1.05 MEQ/gram of the resinous solid matter], 930 parts by weight of Epikote #1004 (epoxy resin produced by Yuka Shell Co. : epoxy equivalent, 930; and softening point, 98° C.), 70 parts by weight of Cumarone G-90 (coumarone resin produced by Nittetsu Kagaku Co. having a softening point of 93° C.), 4 parts by weight of benzoin (flow-out additives), 2 parts by weight of Modaflow (surface-regulating agent produced by Monsanto Chemical Co.) 500 parts by weight of titanium dioxide and 300 parts by weight of ethylene glycol monoethyl ether (hydrophilic solvent having a boiling point of 135° C. and an infinite solubility in water) were heated, uniformly mixed as usual in advance and added to a reactor equipped with a heating, cooling and stirring apparatus.

The mixture was heated to 95° C. with stirring and uniformly mixed with 40 parts by weight of Reponox NCT (nonionic surface active agent, polyoxyethylene alkylphenol, produced by Lion Fat & Oil Co., Ltd. having an HLB of 15.9).

Thereafter, the resulting mixture was uniformly mixed with 32 parts by weight of triethylamine (neutralizing agent) while maintaining the temperature at 85° to 90° C., and then 1000 parts by weight of deionized water was gradually added dropwise thereto from a dropping funnel.

While cooling the resulting mixture, an additional 1622 parts by weight of deionized water was added dropwise, and on cooling the mixture to finally 43° C., phase inversion occurred at 74° C. to obtain a water-dispersible composition in which the resin had been dispersed in water in the form of fine particle.

The content of effective component of the water-dispersible composition obtained was 50%, and the resin particle diameter of the composition was 3 to 15μ.

Hereupon, the mixed resin of Villon GV-230, Epikote #1004 and Cumarone G-90 had a softening point of 95° C., and its polar group concentration was 0.53 MEQ/-gram of resinous solid matter.

EXAMPLE 2

A water-dispersible composition was obtained in the same manner as in Example 1 except that Villon GV-230 was replaced by DPX851-7 [polyamide resin produced by Henkel Japan Co. : amine value, 29; softening point, 88.5° C.; and concentration of polar group (amine group), 0.52 MEQ/gram of resinous solid matter] and triethylamine was replaced by 14 parts by weight of acetic acid.

The content of effective component of the water-dispersible composition obtained was 50%, and the resin particle diameter was 8 20μ. The phase inversion temperature was 70° C. and the final temperature was 38° C.

Hereupon, the mixed resin of DPX851-7, Epikote #1004 and Cumarone G-90 had a softening point of 90° C., and its ploar group concentration was 0.26 MEQ/-gram of resinous solid matter.

COMPARATIVE EXAMPLE 1

A water-dispersible composition was produced in the same manner as in Example 1 except that Reponox NCD (nonionic surface active agent, polyoxyethylene alkylphenol, produced by Lion Fat & Oil Co., Ltd. having an HLB of 8.5) was used as a surface active agent in place of Reponox NCT. As a result, it was found that the phase inversion temperature was 52° C. which was lower than a temperature (65° C.) which was 30° C. lower than the softening point (95° C.) of the mixed resin, and therefore that the resin particle was not produced.

COMPARATIVE EXAMPLE 2

A water-dispersible composition was produced in the same manner as in Example 1 except that Villon GV-230 was replaced by HYCARCTB having a softening point less than 65° C. [polyester resin produced by Ube Industries, Ltd. : acid value, 23.6; viscosity, 500 poises at room temperature; and concentration of polar group (carboxyl group), 0.42 MEQ/gram of resinous solid matter]. As a result, the resin particle was not produced. Hereupon, the mixed resin had a softening point of 52° C., and its polar group concentration was 0.21 MEQ/-gram of resinous solid matter.

Throughout the specification and claims the expression that the phase inversion temperature shall be a temperature higher than 30° C. below the softening point of the organo-synthetic resin but lower than the said softening point means that the phase inversion temperature is a temperature lower than the softening point of the organic synthetic resin but higher than the point of temperature which is lower by 30° C. than the said softening point.

What we claim is:

1. In a method for producing water-dispersible compositions in which an organo-synthetic resin has been dispersed in water in the form of fine particles, a method for producing water-dispersible compositions characterized in that an organo-synthetic resin having a softening point of not less than 65° C. is uniformly heating-mixed with a surface active agent, the mixture obtained is then uniformly mixed with water with stirring while maintaining a temperature above the phase inversion temperature, and the resulting system comprising said resin, surface active agent and water is cooled below the phase inversion temperature to bring about phase inversion in the system, whereby said resin is dispersed in water in the form of fine particles (the phase inversion temperature shall be a temperature higher than 30° C. below the softening point of the organo-synthetic resin but lower than the said softening point).

2. A method for producing water-dispersible compositions as described in claim 1, wherein the organo-synthetic resin has a polar group and the concentration of the polar group is not less than 0.1 milligram equivalent per gram of the resinous solid matter.

3. A method for producing water-dispersible compositions as described in claim 1, wherein the surface active agent is a nonionic one having an HLB of 10 or more.

* * * * *